United States Patent Office 2,852,902
Patented Sept. 23, 1958

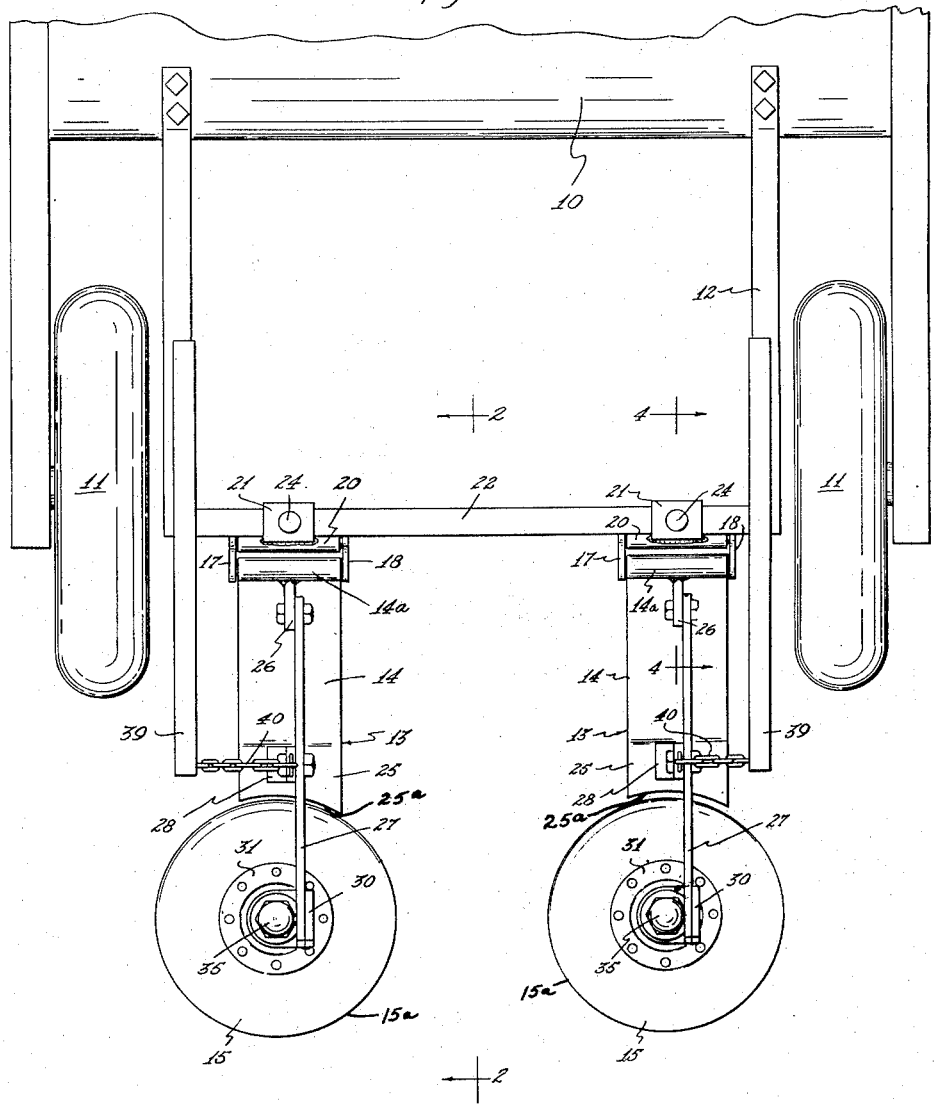

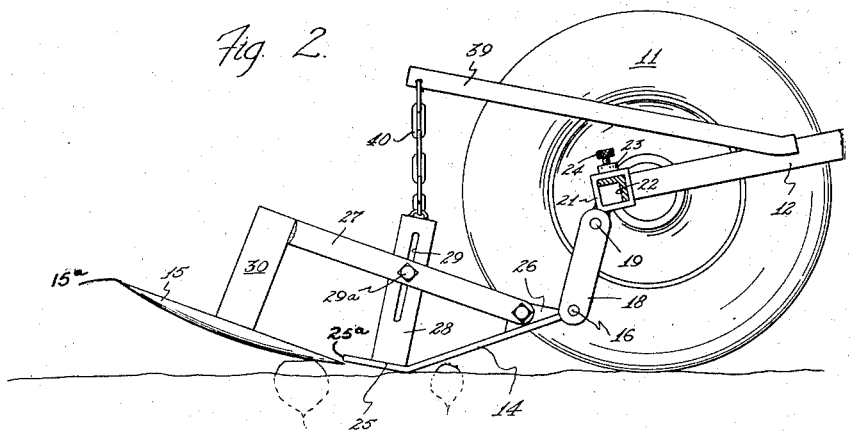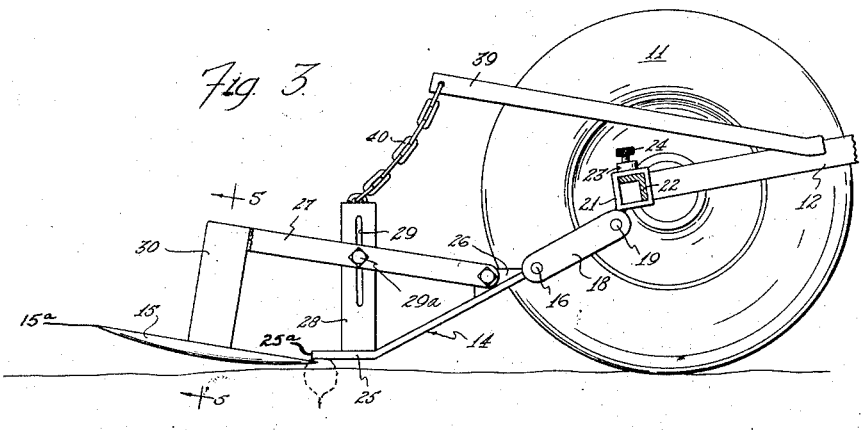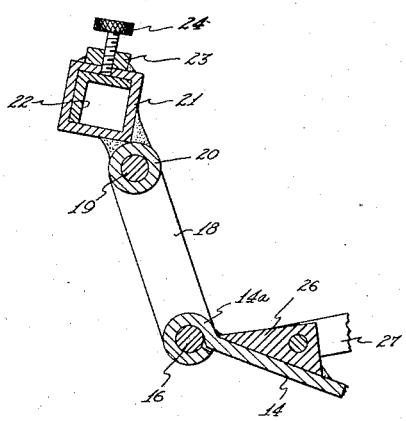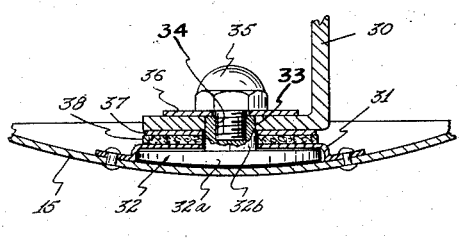

2,852,902

SCALPER FOR BEET TOPPING MACHINES

Heinz Carl Oppel, Boise, Idaho

Application June 21, 1954, Serial No. 437,970

5 Claims. (Cl. 56—121.4)

My present invention relates to improvements in a scalper for beet topping machines.

In the harvesting of certain root crops, such as beets and the like, it is the practice to remove the crown of the root as well as to denude the root of its foliage before the root is finally lifted from the ground.

It is the purpose of this invention to provide a novel scalper which may be attached to a beet topping machine to slice off the root crowns after the foliage has been removed.

A further purpose of the invention is to provide a scalper which will cut each root at the proper level regardless of the height of the root above the ground level.

My improved scalper comprises a cutter which is a slightly cupped circular disk. The cutter is rotatably mounted behind a supporting and indexing shoe. The shoe is mounted at its forward end to levers which connect to the towing vehicle such as a beater that removes the beet foliage. When roots are encountered, even though they differ substantially in height and spacing the shoe shifts angularly and quickly to direct the slicing disk, which scalps the root, at the proper level against the root.

The nature and advantages of the invention will appear more fully in the following description and the accompanying drawings wherein a preferred form of the invention is shown. It should be understood, however, that the description and drawings are illustrative only and are not intended to limit the invention except insofar as it is limited by the claims.

In the drawings:

Figure 1 is a partial plan view of a root topping machine equipped with two of my improved scalpers in order to scalp two rows at a time;

Figure 2 is a sectional view taken substantially on the line 2—2 of Figure 1;

Figure 3 is a sectional view similar to Figure 2 but showing my improved scalper engaging a root;

Figure 4 is an enlarged fragmentary sectional view taken on the line 4—4 of Figure 1; and Figure 5 is an enlarged fragmentary sectional view taken on the line 5—5 of Figure 3.

Referring now to the drawings and to Figure 1 in particular, my invention is shown in cooperation with a beet topping machine, generally indicated by the numeral 10. The machine is supported by wheels 11. A draw bar comprising U-shaped frame 12 is attached to the rear of the machine 10, between the wheels 11. This frame 12 supports a plurality of scalping units 13.

The scalping units 13 are identical so it is believed that a description of one will suffice for all of them. Each of the units 13 has a supporting and indexing shoe 14 which carries a cutting disk 15 behind. The disk 15 has a circular edge shown at 15a in the drawings which is adapted to engage with and slice through root tops as hereinafter described. The shoe 14 is rolled at its forward end to provide a cylindrical bearing 14a. A pin 16 extends through the bearing 14a and has links 17 and 18 attached to its outer ends. A second pin 19 is fixed between the opposite ends of the levers 17 and 18. The pin 19 extends through a cylindrical bearing 20 which is fixed to a rectangular tube 21 as shown in Figure 4. The tube 21 is fitted around an angle iron section 22 which forms the transverse portion of the U-shaped frame 12. A nut 23 is fixed to the tube 21 and a set screw 24 is threaded therein whereby to clamp the tube 21 in the desired position on the angle iron 22. With this construction the shoe 14 is free to swing about the lower pin 16 and the shoe 14 and links 17 and 18 can swing about the pin 19.

The shoe 14 is a plate that extends downwardly and rearwardly from the rolled portion 14a and has an angularly disposed foot portion 25 at its rear end extending upwardly at an acute angle to the main body of the plate. An ear 26 is attached to the forward end of the shoe 14 to provide a front support for a disk carrying bar 27. The foot portion 25 of the shoe 14 carries an upright 28 which is slotted at 29 to provide an adjustable second support for the bar 27. A clamp bolt 29a holds the bar at the desired position relative to the shoe 14. The bar 27 extends rearwardly beyond the upright 28, and mounts at its free end a depending bracket 30. The disk 15 is carried by the bracket 30. The disk 15 is positioned so that the forwardly extending or advancing portion of its edge 15a lies adjacent to and just below the rear edge 25a of the foot 25.

In order to prevent the cutting disk 15 from clogging and to impart a slicing motion to the disk, I mount the disk 15 somewhat to the side of the longitudinal center line of the shoe 14, and provide a mounting on which the disk can rotate freely. In this manner, the disk 15 is slightly more exposed at one side of the shoe than at the other. The disk strikes some roots off center so that as the disk moves forward thru the root it rotates and slices off the crown. The cut portion of the root is then carried on back and dropped, so that the portion of the edge 15a of the disk striking the next root is clear of any trash. The mounting of the shoe is such that lateral movement of the shoe is substantially prohibited.

The means by which the disk 15 is rotatably mounted to the bracket 30 is best shown by Figure 5. A cupped plate 31 is riveted to the disk 15. A bearing member 32 is positioned between the cupped plate 31 and the disk 15. The member 32 has an enlarged head 32a which forms the bearing portion, and has a square shank 32b which extends upwardly through the cupped plate. The bracket 30 has a square aperture 33 therein to nonrotatably receive the square shank 32b. The shank 32b has a central threaded aperture 34 therein to receive a bolt 35 which secures the bearing member 32 to the bracket 30. Metal washers 36 and 37 are provided on each side of the bracket 30 and a felt spacing washer 38 is positioned around the shank 32b between the washer 37 and the cup shaped plate 31. This felt washer 38 seals the bearing from dirt and dust. When the washer 38 becomes worn it can be easily replaced.

The particular construction of the double pivot formed by the pins 16 and 19 and the links 17 and 18 allows the scalping unit 13 to make substantially horizontal cuts at the correct level on each root regardless of the height of the exposed portion of the root. Figures 2 and 3 illustrate this action.

As the unit approaches a large root, and the shoe 14 begins to ride up onto the root, the weight of the cutter disk 15 causes the rear portion of the shoe 14 to remain down while the pivot pin 16 and links 17 and 18 swing up about the pin 19. As the horizontal foot portion 25 passes over the root, the cutter disk 15 engages the root at the desired level, which is selected by adjusting the bar 27 on the upright 28. When the root is engaged by the disk, the drag straightens the links 17 and 18 and the root is cut substantially horizontal. When the disk 15 finishes the cut, the drag is removed and the weight of the shoe 14 causes the pin 16 and links 17 and 18 to swing downward, allowing the shoe to drop to the ground, even though the disk is still sliding over the scalped root. In this manner the disk is tilted forward and its advancing edge lowered so that a smaller root may be engaged at the correct level. See Figures 2 and 3.

In order to prevent the scalping units 13 from dropping into holes in the soil, and to provide for supporting them above the ground for road travel, an angle iron 39 is provided on the frame 12 adjacent each unit 13. Each angle iron 39 extends rearwardly over the scalping unit 13 and has a chain 40 attached to its free end. The opposite end of the chain 40 is removably secured to the upright 28 so that the unit 13 is supported in the event that the unit 13 rides over a hole or large depression in the soil. The chains 40 are, however, long enough to allow the units 13 to ride on the soil under normal conditions.

Another feature of the double pivot connection disclosed herein is that the units 13 are restricted against sidewise motion even though the roots they encounter may be out of line. The wide bearings 14a and 20 and the two links 17 and 18 insure that the scalping units 13 do not swing to either side as they pass over the roots.

Having thus described my invention, I claim:

1. A scalper for root crops such as beets comprising a draw bar, an indexing shoe adapted to be drawn by the bar over the tops of the root, a rotatable disk cutter having a circular edge trailing the shoe and carried solely thereby with the foremost portion of said edge just below the level of the rear edge of the shoe, said disk supported for free rotation in either direction upon engagement of its edge with a root top, shoe pulling links carried by the draw bar and pivoted thereto to swing up and down, said links extending rearwardly from the bar to the shoe and being pivoted to the shoe, whereby the shoe may pivot on the links and swing up and down with the links.

2. A scalper for root crops such as beets comprising a draw bar, an indexing shoe adapted to be drawn by the bar over the tops of the root, a rotatable disk cutter having a circular edge trailing the shoe and carried solely thereby with the foremost portion of said edge just below the level of the rear edge of the shoe, said disk supported for free rotation in either direction upon engagement of its edge with a root top, a disk carrying bracket mounted for vertical adjustment on the shoe and having bearing means at its lower end, rotatably supporting the disk, shoe pulling links carried by the draw bar and pivoted thereto to swing up and down, said links extending rearwardly from the bar to the shoe and being pivoted to the shoe, whereby the shoe may pivot on the links and swing up and down with the links.

3. A scalper for root crops such as beets comprising a draw bar, an indexing shoe adapted to be drawn by the bar over the tops of the root, said shoe having an angularly disposed foot portion at its rear end, a rotatable disk cutter having a circular edge trailing the shoe and carried solely thereby with the foremost portion of said edge just below the level of the rear edge of the shoe, said disk supported for free rotation in either direction upon engagement of its edge with a root top, shoe pulling links carried by the draw bar and pivoted thereto to swing up and down, said links extending rearwardly from the bar to the shoe and being pivoted to the shoe, whereby the shoe may pivot on the links and swing up and down with the links.

4. A scalper for root crops such as beets comprising a draw bar, a link pivoted to the draw bar and extending rearwardly therefrom, an indexing shoe pivoted to the link, said shoe having an angularly disposed rear foot portion, a disk carrying bracket mounted for vertical adjustment on the shoe and having bearing means at its lower end, and a cutting disk having a circular edge, said disk being supported solely by said bearing means for free rotation in either direction upon engagement with a root top, said disk being positioned with the foremost portion of said edge adjacent to and below the level of the rear edge of said angularly disposed foot portion.

5. A scalper for root crops such as beets comprising a draw bar, a link pivoted to the draw bar and extending rearwardly therefrom, an indexing shoe pivoted to the link, said shoe having an angularly disposed rear foot portion, disk carrying means supported on said shoe, and a cutting disk having a circular edge carried solely by said carrying means for free rotation thereon about an axis of rotation, said disk being positioned with the foremost portion of its circular edge adjacent to and below the level of the rear edge of the angularly disposed foot portion, the axis of rotation of said disk being offset laterally from the longitudinal center of said foot portion.

References Cited in the file of this patent

UNITED STATES PATENTS

| | | |
|---|---|---|
| 1,075,939 | Powlison | Oct. 14, 1913 |
| 1,099,643 | Goode et al. | June 9, 1914 |
| 1,121,839 | Huish | Dec. 22, 1914 |
| 1,327,760 | Johnson | Jan. 13, 1920 |
| 1,463,078 | Gilmore et al. | July 24, 1923 |
| 1,957,108 | Pierson | May 1, 1934 |
| 2,141,806 | Zielesch | Dec. 27, 1938 |
| 2,337,307 | Beck | Dec. 21, 1943 |
| 2,759,318 | Oppel | Aug. 21, 1956 |